United States Patent
Griffin, III. et al.

(10) Patent No.: US 7,018,233 B1
(45) Date of Patent: Mar. 28, 2006

(54) ADAPTER SOCKET FOR A RECHARGEABLE BATTERY

(76) Inventors: Ralph W. Griffin, III., 19590 E. Campbell Rd., Bend, OR (US) 97702; Ralph W Griffin, Jr., c/o Ralph W. Giffin, III 19590 E. Campbell Rd., Bend, OR (US) 97702

( * ) Notice: Subject to any disclaimer, the term of this patent is extended or adjusted under 35 U.S.C. 154(b) by 353 days.

(21) Appl. No.: 10/298,780

(22) Filed: Nov. 18, 2002

(51) Int. Cl.
*H01R 11/00* (2006.01)

(52) U.S. Cl. ..................................... 439/504

(58) Field of Classification Search ........ 439/500–504, 439/374, 680, 668, 131, 20, 23; 307/20, 307/150, 66; 340/438; 320/107, 112, 2, 320/101; 323/225
See application file for complete search history.

(56) References Cited

U.S. PATENT DOCUMENTS

| | | | |
|---|---|---|---|
| 3,967,133 A | 6/1976 | Bokern | |
| 4,540,929 A * | 9/1985 | Binkley | 320/104 |
| 4,647,139 A | 3/1987 | Yang | |
| 4,720,274 A | 1/1988 | Tackett et al. | |
| 4,936,796 A | 6/1990 | Anderson, Jr. | |
| 5,076,805 A | 12/1991 | Welch | |
| 5,230,641 A | 7/1993 | Wharton | |
| 5,254,927 A | 10/1993 | Chiang | |
| 5,302,857 A * | 4/1994 | Charles et al. | 307/20 |
| 5,354,215 A | 10/1994 | Viracola | |
| 5,510,691 A * | 4/1996 | Palatov | 320/111 |
| 5,564,943 A | 10/1996 | Weiss | |
| 5,593,323 A * | 1/1997 | Dernehl | 439/668 |
| 5,599,204 A | 2/1997 | Glassford | |
| 5,766,020 A | 6/1998 | Hughes | |
| 5,793,184 A * | 8/1998 | O'Connor | 320/101 |
| 5,844,472 A * | 12/1998 | Lee | 340/438 |
| 5,912,514 A * | 6/1999 | Stendardo et al. | 307/64 |
| 5,993,262 A | 11/1999 | Kowdynski et al. | |
| 6,007,373 A | 12/1999 | Chew | |
| 6,104,162 A * | 8/2000 | Sainsbury et al. | 320/111 |
| 6,201,370 B1 | 3/2001 | Reller et al. | |
| 6,358,096 B1 | 3/2002 | Beckman | |
| 6,413,101 B1 | 7/2002 | Divoll et al. | |
| 6,483,273 B1 * | 11/2002 | Lee | 320/111 |
| 6,528,970 B1 * | 3/2003 | Liu et al. | 320/107 |
| 6,551,123 B1 * | 4/2003 | Schaeffeler et al. | 439/374 |
| 2002/0089306 A1 | 7/2002 | Kubale et al. | |

* cited by examiner

*Primary Examiner*—Alexander Gilman
(74) *Attorney, Agent, or Firm*—David S. Alavi

(57) ABSTRACT

An device with a standard automotive electrical accessory plug may be connected to a standard rechargeable battery for a cordless power tool with an electrical adapter. The electrical adapter has a socket for receiving the automotive accessory plug. The sleeve and center contact of the socket are each connected to respective conductive members, with ends thereof forming one or two electrical plugs. The electrical plugs make electrical contact with terminal contacts of the battery. The electrical plug(s) may be is used with a tower-type rechargeable cordless power tool battery and/or a slide-on-type rechargeable cordless power tool battery. The electrical adapter enables portable use of the device powered by the rechargeable battery, without remaining near another power source such as an automobile. The electrical adapter enables recharging of the battery using an alternate charging power source.

71 Claims, 7 Drawing Sheets

ADAPTER SOCKET FOR A RECHARGEABLE BATTERY

BACKGROUND

The field of the present disclosure and/or appended claims relates to rechargeable batteries and adapters therefor. In particular, adapter sockets are disclosed and/or claimed herein for use with rechargeable batteries.

A wide variety of batteries, connectors, cables, chargers, and adapters are available for powering electrical equipment of various sorts. Some of these are described in:

U.S. Pat. No. 3,967,133 entitled "Power supply means" issued Jun. 29, 1976 to Bokern;

U.S. Pat. No. 4,647,139 entitled "Extension cord charging device for connecting tools and appliances to plug receptacle in vehicle" issued Mar. 3, 1987 to Yang;

U.S. Pat. No. 4,720,274 entitled "Electrical connector assembly" issued Jan. 19, 1988 to Tackett et al;

U.S. Pat. No. 4,936,796 entitled "Auto accessory electrical adaptor" issued Jun. 26, 1990 to Anderson, Jr.;

U.S. Pat. No. 5,076,805 entitled "Adaptor for hand held power tool" issued Dec. 31, 1991 to Welch;

U.S. Pat. No. 5,230,641 entitled "Electrical receptacle" issued Jul. 27, 1993 to Wharton;

U.S. Pat. No. 5,254,927 entitled "Battery charger with appliance plug socket"issued Oct 19, 1993 to Chiang;

U.S. Pat. No. 5,354,215 entitled "Circuit interconnect for a power tool" issued Oct. 11, 1994 to Viracola;

U.S. Pat. No. 5,564,943 entitled "Electric socket convertor" issued Oct. 15, 1996 to Weiss;

U.S. Pat. No. 5,599,204 entitled "Voltage adapter" issued Feb 4, 1997 to Glassford;

U.S. Pat. No. 5,766,020 entitled "Power adapter interface apparatus" issued Jun. 16, 1998 to Hughes;

U.S. Pat. No. 5,993,262 entitled "Electrical adaptor" issued Nov. 30, 1999 to Kowdynski et al;

U.S. Pat. No. 6,007,373 entitled "Apparatuses and methods for coupling DC power tools to external DC power sources" issued Dec. 28, 1999 to Chew;

U.S. Pat. No. 6,201,370 entitled "Portable power supply" issued Mar. 13, 2001 to Reller et al;

U.S. Pat. No. 6,358,096 entitled "Multiple source power adapter for output power control" issued Mar. 19, 2002 to Beckman;

U.S. Pat. No. 6,413,101 entitled "Power outlet adapter" issued Jul. 2, 2002 to Divoll et al; and U.S. Pat. app. Ser. No. US 2002/0089306 entitled "Adapter for a power tool battery" published Jul. 11, 2002 in the name of Kubale et al.

A very common type of adapter makes possible the operation of electrical equipment using 12 V DC power supplied by an automobile battery and/or alternator (if the automobile engine is running). Such car adapters typically plug into the cigarette lighters nearly ubiquitously provided in automobiles, such cigarette lighters usually taking the form of a cylindrical socket with a conductive sleeve and a conductive center contact. The mating adapter plug typically includes a conductive outer shell for making contact with the socket sleeve and a center pin for making contact with the socket center contact. More recently, many auto manufacturers have begun to provide one or more such sockets in vehicles as dedicated power outlets, without also serving as cigarette lighters. While this type of adapter is very useful and finds application in a wide array of situations, the operating device is nevertheless constrained to remain within the proximity of the vehicle. It is often, but not always, the case that the electrical equipment operated in this way is intended to be operated in some other way as its usual mode of operation, and the car adapter is provided for occasions when that usual mode of operation is unavailable or depleted. For example, cell phones and laptop computers usually run off of their own dedicated batteries but may be operated using a car adapter as well.

A well-developed array of cordless power tools have been developed and are available in the professional and consumer marketplaces. Such cordless power tools offer obvious benefits for a user, who is no longer hampered or constrained by a corded connection to a power source while using the tool. These cordless power tools are powered by rechargeable batteries, and typically include a separate recharging unit for recharging the battery (the recharging unit typically being plugged into a household electrical outlet). Such cordless power tools are available for operating at several industry-standard battery voltages (including 24, 18, 14.4, 12, 9.6, 7.2, 4.8, 3.6, and 2.4 volts, although other voltages may be employed), and batteries tend to come in one of only a few industry-standard mechanical configurations for assembly/connection with the tools. Multiple batteries might be employed with one tool, with a first battery in use while the second is recharging. A single battery may also be swapped between different tools (at least those of the same manufacturer). Several adapters have been developed for operating these cordless tools connected to alternate power supplies (in corded fashion), presumably for those situations when a user may not wish to wait for the battery to charge. Such adapters may serve to operate the cordless tool connected to a household electrical outlet (in which case the adapter must include an AC-to-DC converter), to a car battery (in which case the adapter would typically include an adapter plug as described in the previous paragraph), directly to a battery charger (which is in turn typically connected to a household outlet and includes an AC-to-DC converter), or to some other suitable alternate power source.

While use of cordless power tools using alternative power sources has been implemented, use of batteries provided for those tools for powering other devices has not heretofore been contemplated. It would be desirable to enable use of such rechargeable cordless tool batteries (of which millions of units are already deployed and new units are readily available commercially) for portable powering of other devices. Many devices for which such a power source (i.e., a DC battery) would be suitable are already equipped with, or may be readily adapted for use with, an adapter for a car power socket (i.e., cigarette lighter). Use of a rechargeable cordless tool battery would enable portable operation of the devices away from a vehicle.

SUMMARY

A method for providing portable electrical power to an electrical device (the device having a device plug including a conductive portion of its outer surface and a center conductive pin) includes: connecting a first battery terminal contact to the conductive portion of the outer surface of the device plug with an electrical adapter; and connecting a second battery terminal contact to the center conductive pin of the device plug with the electrical adapter. The electrical adapter includes an adapter socket and a pair of electrically conductive members. The adapter socket includes a conductive sleeve connected to one conductive member and a conductive contact connected to the other conductive member. The sleeve forms a passage having an open end and is adapted to receive the device plug and establish electrical contact with the conductive portion of the outer surface of the device plug. The conductive contact (which is insulated from the sleeve) is positioned at the other end of the passage for establishing electrical contact with the center conductive pin of the device plug. Each conductive member has a substantially rigid elongated end thereof arranged in a substantially parallel spaced-apart arrangement with the elongated end of the other conductive member thereby forming an electrical plug. A first electrical plug is adapted for engaging the first and second battery terminal contacts and thereby providing electrical connections (i) between the conductive sleeve and the first battery terminal contact and (ii) between the conductive contact and the second battery terminal contact. The other ends of the conductive members may be similarly substantially rigid, elongated, and arranged to form a second electrical plug.

The adapter socket may be adapted to receive standard automotive electrical accessory plugs (including standard cigarette lighter automotive electrical accessory plugs). The first and second electrical plugs may be different widths for connecting to batteries of differing sizes. The conductive members may each be further provided with a screw terminal for enabling connection to other power sources, and the adapter may be further provided with an output voltage regulator, limiter, and or switch, and/or an output polarity indicator and/or switch. A housing may be provided for insulating the conductive members and the outer surface of the sleeve, and may comprise a polymeric material in which the conductive members and sleeve are embedded (except for the ends forming the electrical plugs) or a hollow housing from which the plugs protrude. The conductive member ends (forming the plug) may be adapted for engaging between and/or around the battery terminal contacts.

The electrical plug(s) may be adapted to provide electrical connections to standard rechargeable batteries for cordless power tools, either of the tower type or the slide-on type. After providing the electrical adapter to a user, the user is instructed to (i) disengage a rechargeable battery from a cordless power tool or battery charger, (ii) engage the electrical plug and the battery terminal contacts of the rechargeable battery, and (iii) plug an electronic device (with a standard automotive electrical accessory plug) into the adapter socket. The first and second electrical plugs of the electrical adapter may be adapted for engaging standard tower-type and/or slide-on-type rechargeable batteries for cordless power tools. The adapter may also be employed for connecting cordless power tool rechargeable batteries (including tower-type and slide-on-type) to an alternate charging power source.

Objects and advantages of the present invention may become apparent upon referring to the disclosed embodiments as illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 6:
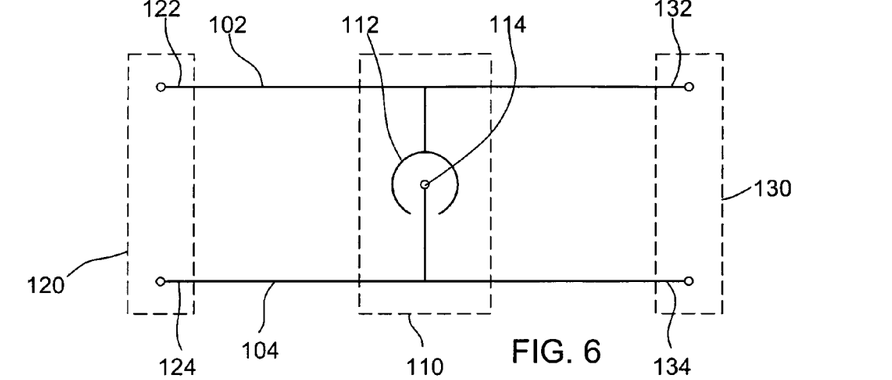
FIGS. 6, 7, 8, 9, 10, and 11 are schematic circuit diagrams for exemplary electrical adapters.

FIGS. 1A–1E and 2A–2B illustrate an electrical adapter generally designated 100 and including an adapter socket 110 and electrical plugs 120 and 130. A schematic circuit diagram appears in FIG. 6. Adapter socket 110 includes a conductive sleeve 112 and a conductive contact 114. Sleeve 112 forms an open-ended passage for receiving a device plug of an electrical device to be connected to a power source. An insulating housing 101 surrounds sleeve 112 and substantially insulates its outer surface from a use environment, and also serves to insulate sleeve 112 and contact 114 from one another. Housing 101 may comprise a polymeric material (such as molded urethane, for example; other suitable polymeric materials may be equivalently employed) in which are embedded sleeve 112, contact 114, and other elements of the electrical adapter. Housing 101 may alternatively comprise any suitably arranged and adapted housing structure, including a hollow or shell-type housing, for substantially insulating the outer surface of sleeve 112, as well as other elements of the adapter, from a use environment.

Sleeve 112 is electrically connected to a conductive member 102 within housing 101, while contact 114 is electrically connected to another conductive member 104 within housing 101. Substantially rigid elongated ends 122 and 124 of conductive members 102 and 104, respectively, protrude from housing 101 in a substantially parallel spaced-apart arrangement to form an electrical plug 120. The electrical plug 120 may engage a pair of battery terminal contacts, and the electrical adapter 100 may therefore serve to provide electrical connections between one battery terminal contact and sleeve 112 and between the other battery terminal contact and contact 114. An electrical device supplied with a device plug having an outer surface including a conductive portion thereof, and center conductive pin, may be inserted into adapter socket 110 to provide electrical contact with sleeve 112 and contact 114, respectively, thereby enabling the electrical device to obtain power from the battery.

Conductive members 102 and 104 may be each provided with substantially rigid second ends 132 and 134, respectively, which protrude from housing 101 in a substantially parallel spaced-apart arrangement to form electrical plug 130. Electrical plug 130 may engage battery terminal contacts in a manner similar to that described in the preceding paragraph to provide a electrical power to an electrical device from the battery. While remaining within the scope of the present disclosure and/or appended claims, additional electrical plugs may be formed in a similar manner on electrical adapter 100.

Electrical adapter 100 and adapter socket 110 may be adapted for receiving a standard automotive electrical accessory plug, including plugs designed for connecting through an automotive cigarette lighter as well as through a dedicated automotive power outlet. Automotive electrical systems typical operate at about 12 V DC, although there may be variation in the voltage (intended and/or unintended). Many electrical devices, particularly portable electrical devices, include plugs and/or adapters for connecting to such automotive power outlets. Such devices may include those for which the automotive power outlet is the intended primary power source, and those devices where the automotive power outlet is a secondary or auxiliary power source (examples of this latter category may include, but are not limited to, mobile phones, portable or laptop computers, chargers for such devices, and so on). Operation of such devices still then requires the presence of a vehicle as a power source. An electrical adapter as disclosed herein enables use of such devices (with their automotive power outlet plugs) with portable batteries of a variety of types, and operation of the electrical devices away from the vehicle. Rechargeable batteries for cordless power tools are highly portable, widely deployed, and widely available, and are therefore a suitable power source for portable powering of an electrical device using an electrical adapter according to the present disclosure and/or appended claims.

Cordless power tool batteries come in a variety of mechanical and electrical configurations. An electrical adapter 100 may be adapted to accommodate such variation. For example, electrical plugs 120 and 130 may differ in size for accommodating batteries of differing sizes. Protruding ends 122/124 and/or 132/134 may be resiliently biased against lateral movement, while allowing some degree of such movement, to accommodate differences in battery size and/or terminal contact arrangement. Such resilient biasing may be provided by the resiliency of the conductive material (presumably a metal conductor) as it forms ends 122/124 and/or 132/134, or housing 101 may be adapted for such resilient biasing (by including resilient gaskets or grommets where the ends pass through a wall of a hollow housing, or by using a resilient polymeric embedding material, or by other suitable means). Such resilient biasing may also serve to enhance the integrity of electrical contact established between ends 122/124 and/or 132/134 and corresponding battery terminal contacts. For example, ends 122/124 may be resiliently biased against movement apart, and the battery terminal contacts (and perhaps a portion of the battery as well) may be inserted between the ends 122/124. Resilient biasing of the ends 122/124 serves compress the battery terminal contacts between the ends 122/124 and to thereby secure engagement of electrical plug 120 with the battery terminal contacts. For another example, ends 132/134 may be resiliently biased against movement toward one another, and they may be inserted between spaced-apart battery terminal contacts. Resilient biasing of the ends 132/134 allows compression thereof between the battery terminal contacts and to thereby secure the engagement of electrical plug 130 with the battery terminal contacts.

Figure 1A:
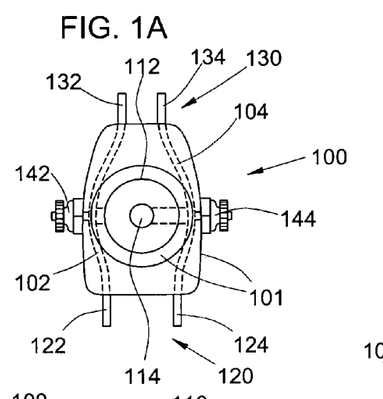
FIGS. 1A, 1B, 1C, 1D, and 1E are top, first end, side, second end, and bottom views, respectively, of an exemplary electrical adapter.
Figure 1B:
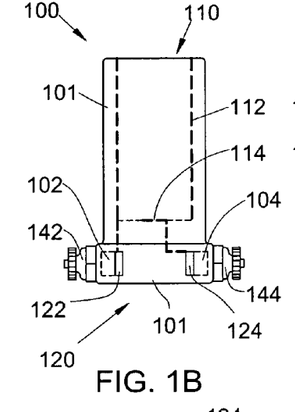
Figure 1C:
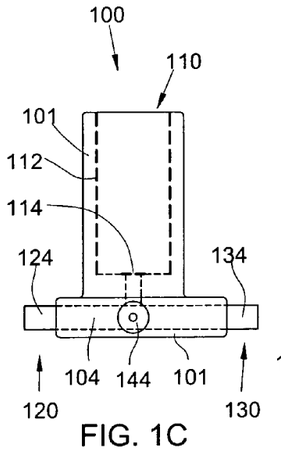
Figure 1D:
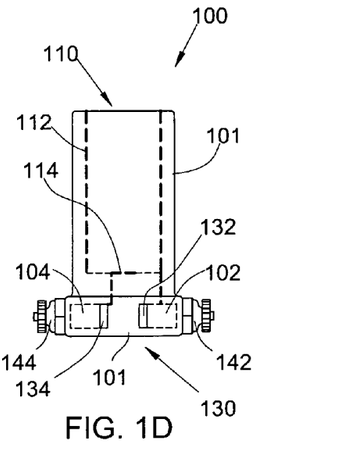
Figure 1E:
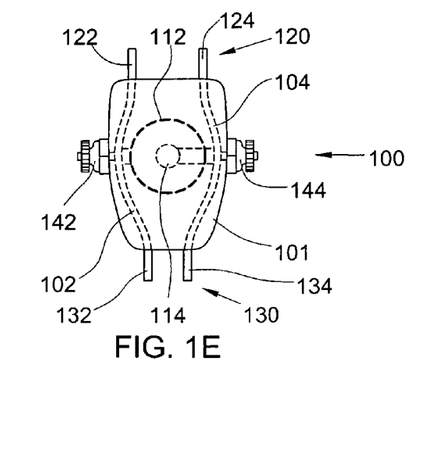
Figure 2A:
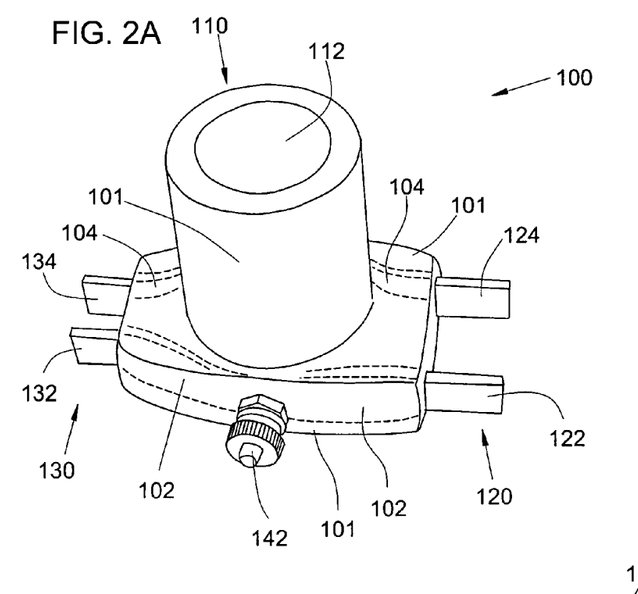
FIGS. 2A and 2B are perspective views of an exemplary electrical adapter.
Figure 2B:
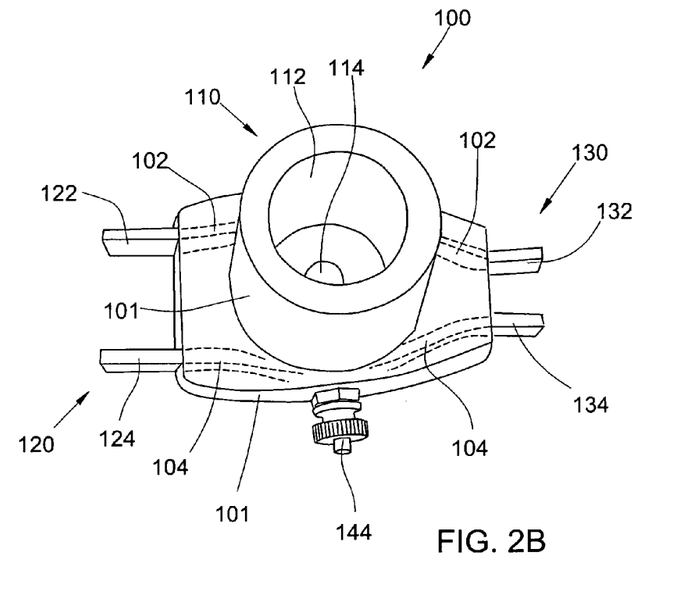
Figures 3A, 3B, 3C:
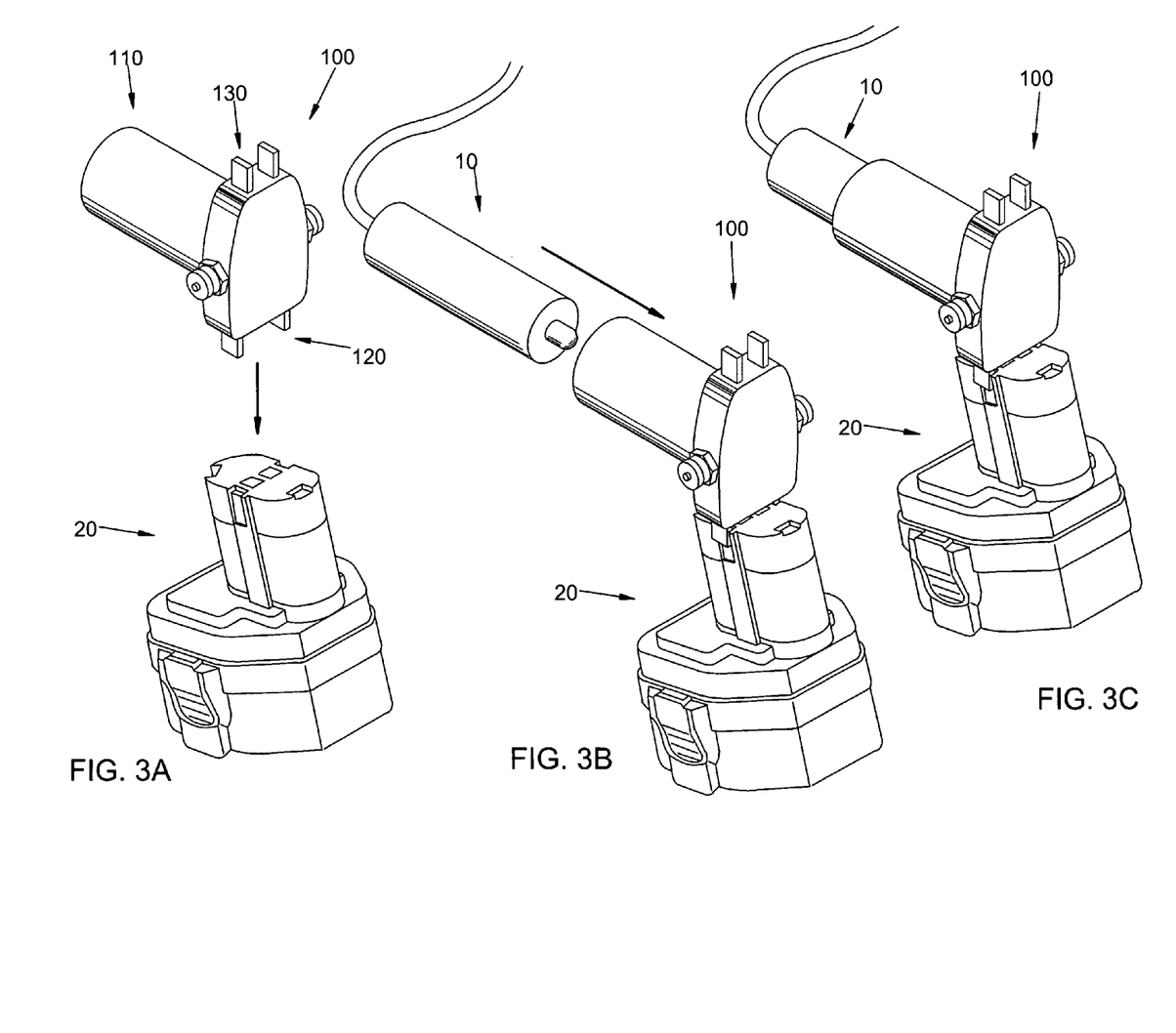
FIGS. 3A, 3B, and 3C illustrate a method for using an exemplary electrical adapter with a tower-type cordless power tool rechargeable battery.
Figures 4A, 4C:
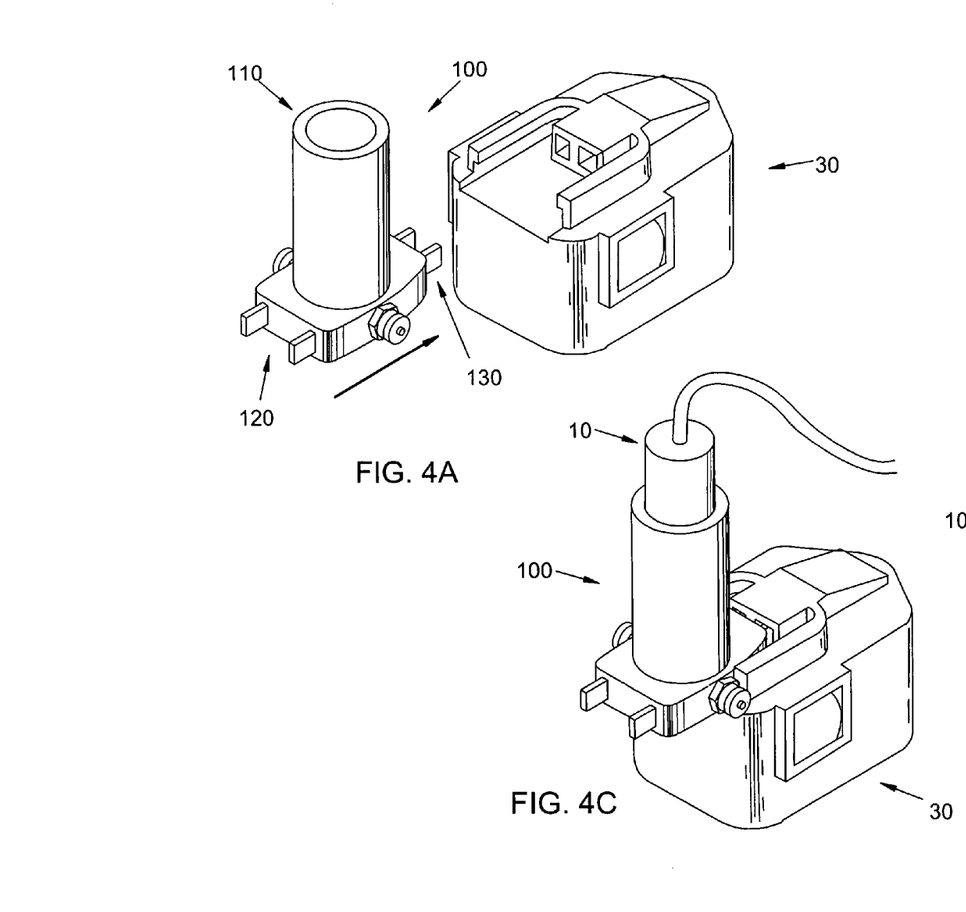
FIGS. 4A, 4B, and 4C illustrate a method for using an exemplary electrical adapter with a slide-on-type cordless power tool rechargeable battery.
Figure 4B:
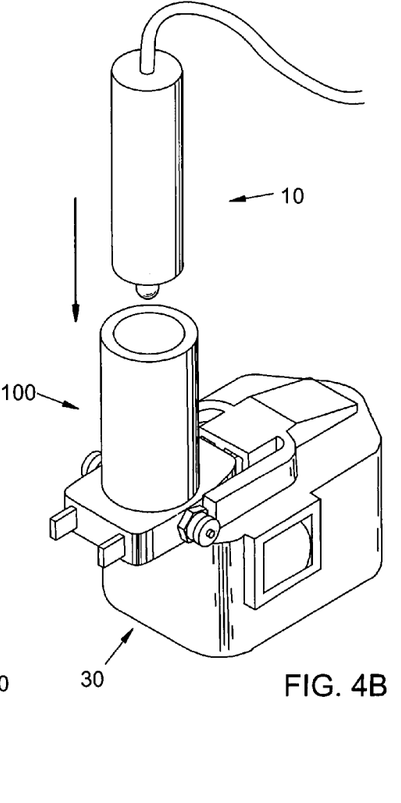
Figure 5:
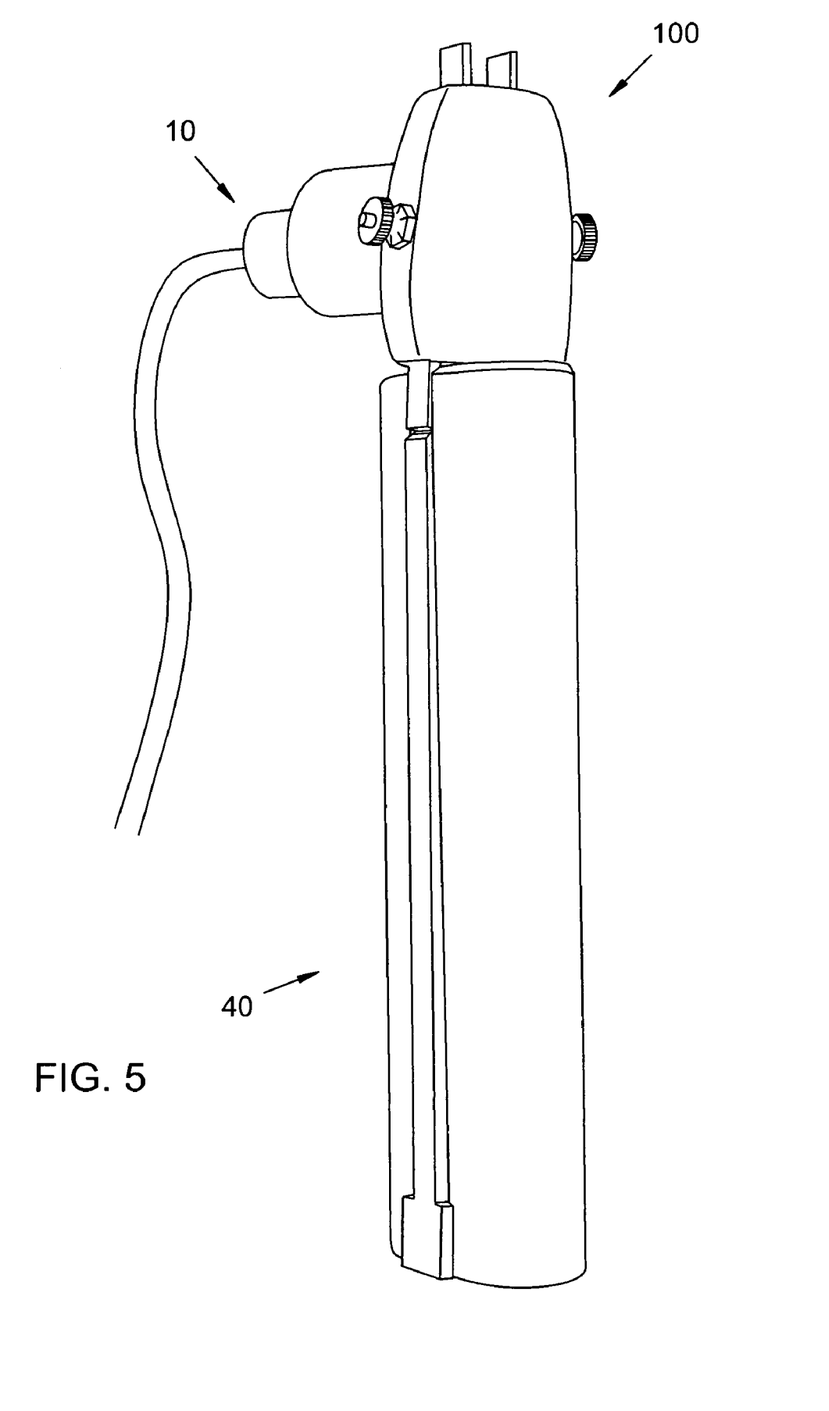
FIG. 5 illustrates an exemplary electrical adapter engaged with a rechargeable battery.

Such adaptations of electrical plugs 120 and/or 130 of adapter 100 may serve to enable use of the adapter with many commonly-available rechargeable cordless power tool batteries, including tower-type batteries, slide-on-type batteries, and other types of rechargeable cordless power tool batteries. FIGS. 3A/3B/3C illustrate a procedure for connecting an electrical device with an automotive electrical accessory plug 10 to a tower-type cordless tool rechargeable battery 20 using electrical adapter 100 (through socket 110 and electrical plug 120). FIGS. 4A/4B/4C illustrate a procedure for connecting an electrical device with an automotive electrical accessory plug 10 to a slide-on-type cordless tool rechargeable battery 30 using electrical adapter 100 (through socket 110 and electrical plug 130). FIG. 5 shows electrical adapter 100 engaged with automotive electrical accessory plug 10 through socket 110 and with a rechargeable battery 40 of yet another type. Such uses are exemplary only, and use of adapter 100 for connecting an electrical device to any standard rechargeable cordless power tool battery, or other suitable battery, shall fall within the scope of the present disclosure and/or appended claims. In particular, each of plugs 120 and 130 may be used with the corresponding ends between battery terminal contacts or around battery terminal contacts, with or without resilient biasing as described hereinabove.

Figure 7:
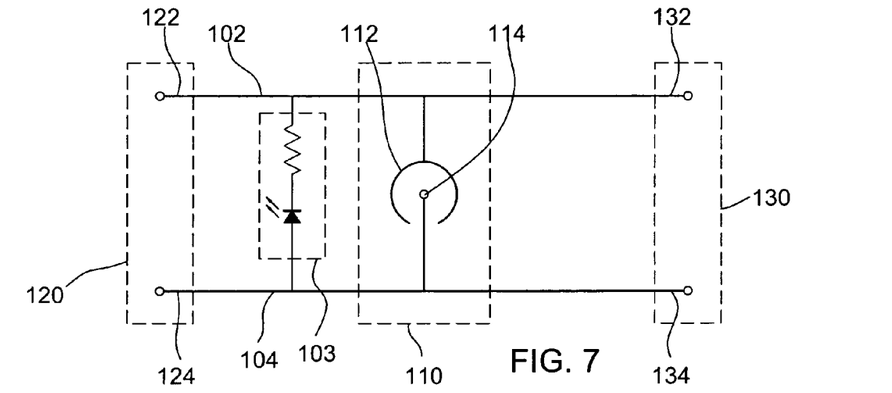
Figure 8:
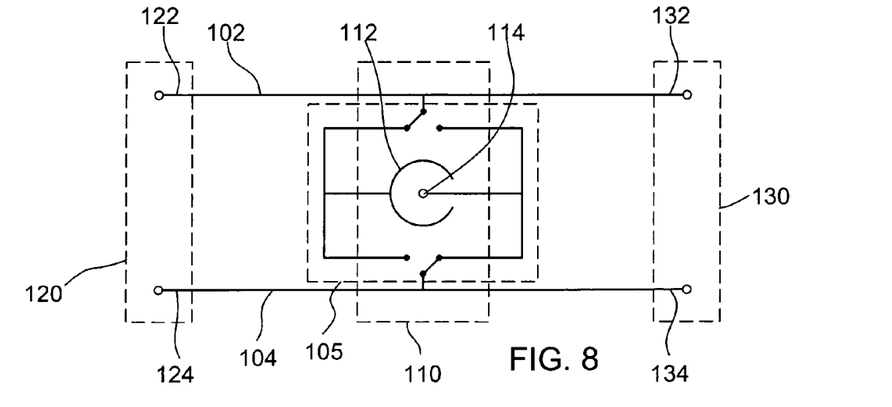

Many DC-driven electrical devices, including those which may be powered from an automotive power outlet, are sensitive to the polarity of the supplied voltage. Such sensitivity may range from non-optimal operation with the wrong polarity to damage to or destruction of the electrical device operated with the wrong polarity. Standard automotive electrical power outlets and standard automotive electrical accessory plugs are designed to eliminate this issue, with the sleeve/outer surface being at ground potential and the center pin/center contact being held at about 12 V. Use of an electrical adapter 100 offers an opportunity to connect an electrical device to its power source with the wrong polarity. Some rechargeable cordless power tool batteries may be provided with mechanical alignment or registering members for facilitating proper assembly with and connection to the cordless power tool. An embodiment of electrical adapter 100 may be provided with corresponding alignment/registering members for engaging such members on a particular cordless tool battery type. Another embodiment of electrical adapter 100 may be provided with a polarity indicator 103 for informing the user that the polarity is correct. For example, a diode and light source (and perhaps also current-limiting a resistor) may be connected in series between conductive members so that the bulb lights up only when the contact 114 (and conductive member 104) is at a positive voltage relative to shell 112 (and conductive member 102). A light-emitting diode (LED) connected with the appropriate polarity (perhaps along with other suitable circuit elements) may similarly be arranged to light up only when the polarity across contacts 114 and shell 112 is correct (FIG. 7). Other suitable indicators may be equivalently employed. A fuse in series with a diode (and perhaps other circuit elements) may provide a more drastic degree of polarity protection. An embodiment of electrical adapter 100 may be provided with a switch 105 for enabling user selection of the output voltage polarity without disconnecting and reconnecting the adapter from the battery (FIG. 8). Such a polarity switch may be used to provide the correct polarity even if the adapter/battery are not suitable for reversing the connection (FIGS. 4A/4B/4C for example).

Figure 9:
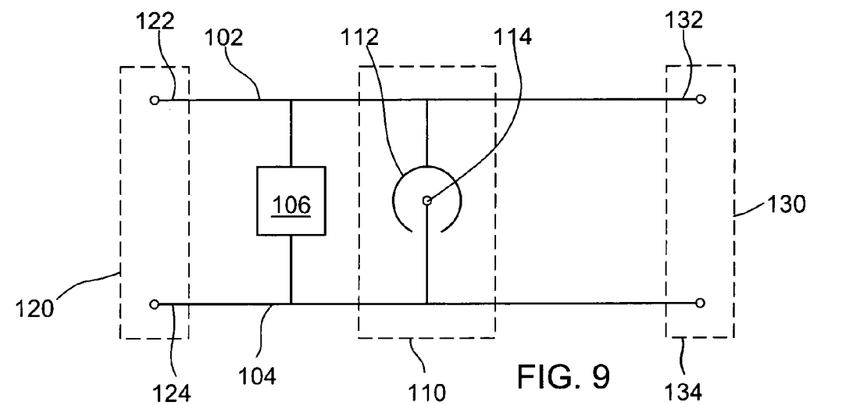
Figure 10:
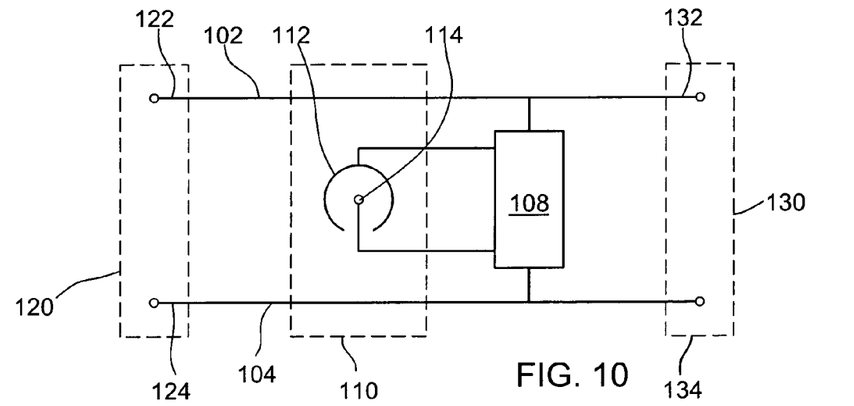
Figure 11:
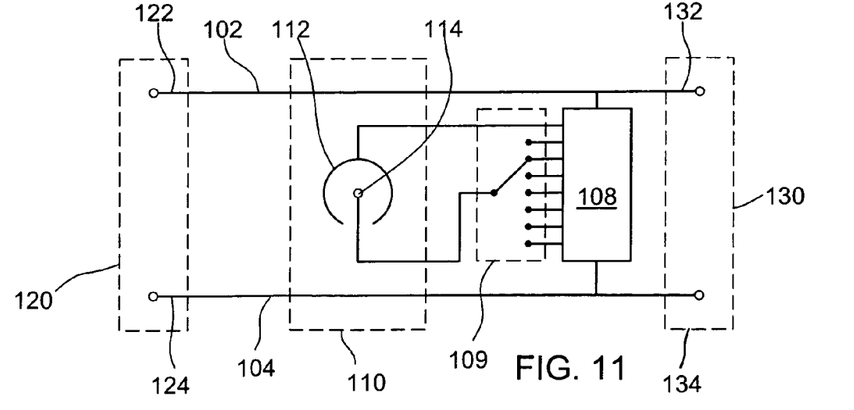

The operating voltages of standard rechargeable may range from 24 V (or more) to 2.4 V (or less). Automotive power outlets typical provide around 12 V, although there may be variations (intended and/or unintended) in the voltage provided. Use of an embodiment of electrical adapter 100 may therefore be restricted to use with 12-volt cordless power tool batteries. In an embodiment of electrical adapter 100 (FIG. 9), a voltage limiter 106 of any suitable type (such as a Zener diode, for example; any other suitable voltage limiter may be equivalently employed) may be provided connecting conductive member 102 and 104 for limiting the voltage across electrical plug 120 and/or 130 to around 12 V (or to some other desired nominal output voltage). Such a voltage limiter may therefore protect 12-volt electrical devices during use with higher-voltage cordless power tool batteries, but may or may not enable their operation with lower-voltage cordless tool batteries (depending on the nature of the device). In another embodiment of electrical adapter 100 (FIGS. 10 and 11), connections from conductive members 102 and 104 to sleeve 112 and contact 114, respectively, may be made through a DC-to-DC voltage regulator 108 of any suitable type (which may include an integrated circuit designed for providing such functionality). Such a regulator may therefore enable use of 12-volt (or other desired nominal operating voltage) electrical devices powered by cordless power tool batteries of a wide range of voltages. Voltage regulator 108 may be adapted for providing a single nominal output voltage (12 V, for example; FIG. 10), or may be adapted for enabling user selection of an output voltage using a multi-position switch 109, for example (FIG. 11).

In order to enable any standard rechargeable cordless power tool battery to be used with electrical equipment lacking a standard automotive electrical accessory plug or compatible variant thereof, screw terminals 142 and 144 may be provided protruding from housing 101 and connected to conductive 102 and 104, respectively.

Electrical adapters as disclosed and/or claimed herein may be provided to users in a variety of ways, including retail and/or wholesale sales. The user may be instructed to: (i) disengage a standard rechargeable battery from a cordless power tool or charger; (ii) engage an electrical plug of the adapter with the terminal contacts of the battery; and (iii) plug the electrical device (using its automotive-type plug) into the socket of the electrical adapter. The user may be further instructed to check polarity, select polarity, select output voltage, and so forth, if applicable.

In addition to providing power from a battery to an electrical device having an automotive electrical accessory plug, an electrical adapter as disclosed and/or claimed herein may be employed for charging a rechargeable battery as well. The electrical adapter may be connected to a charging power source (such as a car battery, an automotive power outlet or cigarette lighter, a solar panel, an AC adapter plugged into a household outlet, and so on). The battery to be charged is connected to the electrical adapter using an electrical plug of the adapter. The charging power source may be connected to the screw terminals of the electrical adapter, or into the socket of the electrical adapter if the charging power source has a compatible automotive accessory type plug.

It is intended that modifications to the disclosed embodiments may be made without departing from inventive concepts disclosed and/or claimed herein.

What is claimed is:

1. An electrical adapter, comprising:
    an adapter socket including a conductive sleeve and a conductive contact, the sleeve being substantially electrically insulated from the contact, the sleeve forming a passage having an open first end, the sleeve being adapted for (i) receiving a device plug therein and (ii) providing electrical contact to a conductive portion of an outer surface of the device plug, the contact being positioned within the passage at a second end thereof and being adapted for providing electrical contact to a center conductive pin of the device plug;
    first and second conductive members electrically connected to the sleeve and contact, respectively,
    each of the first and second conductive members having a corresponding first elongated substantially rigid end thereof, the corresponding first ends of the first and second conductive members being arranged in a substantially parallel spaced-apart arrangement thereby forming a first electrical plug, the first electrical plug being thereby adapted for engaging a pair of battery terminal contacts and thereby providing electrical connections (i) between the conductive sleeve and one of the battery terminal contacts and (ii) between the conductive contact and the other of the battery terminal contacts,
    each of the first and second conductive members having a corresponding second substantially rigid elongated end thereof, the corresponding second ends of the first and second conductive members being arranged in a substantially parallel spaced-apart arrangement thereby forming a second electrical plug, the second electrical plug being thereby adapted for engaging a pair of battery terminal contacts and thereby providing electrical connections (i) between the conductive sleeve and one of the battery terminal contacts and (ii) between the conductive contact and the other of the battery terminal contacts.

2. The apparatus of claim 1, the first electrical plug being adapted for engaging terminal contacts of a standard rechargeable battery for a cordless power tool.

3. The apparatus of claim 1, the adapter socket being adapted for receiving a device plug in the form of a standard automotive electrical accessory plug.

4. The apparatus of claim 1, the adapter socket being adapted for receiving a device plug in the form of a standard cigarette lighter automotive electrical accessory plug.

5. The apparatus of claim 1, further comprising:
    a first adapter terminal electrically connected to the first conductive member; and
    a second adapter terminal electrically connected to the second conductive member,
    the apparatus being thereby adapted for providing electrical connections (i) between the first terminal and one of the battery terminal contacts and (ii) between the second terminal and the other of the battery terminal contacts.

6. The apparatus of claim 1, further comprising an output voltage limiter connected to the first and second conductive members, thereby maintaining an output voltage between the conductive members substantially within an operating voltage range.

7. The apparatus of claim 1, electrical connections between the first conductive member and the sleeve and between the second conductive member and the contact being made through an output voltage regulator, thereby maintaining an output voltage between the conductive members substantially within an operating voltage range.

8. The apparatus of claim 1, electrical connections between the first conductive member and the sleeve and between the second conductive member and the contact being made through a multiple-output-voltage voltage regulator adapted for enabling user selection of an output voltage range, the voltage regulator maintaining an output voltage between the conductive members substantially within a selected operating voltage range.

9. The apparatus of claim 1, further comprising a polarity indicator connected to the first and second conductive members, thereby indicating to a user polarity of an output voltage between the conductive members.

10. The apparatus of claim 1, further comprising a polarity switch connected to the first and second conductive members, thereby enabling user selection of polarity of an output voltage between the conductive members.

11. The apparatus of claim 1,
    the spaced-apart first elongated ends of the conductive members being resiliently biased so as to resist relative lateral movement away from one another, thereby adapting the first electrical plug for engaging, between the first elongated ends of the conductive members, a pair of battery terminal contacts, the spaced-apart second elongated ends of the conductive members being resiliently biased so as to resist relative lateral movement toward one another, thereby adapting the second electrical plug for engaging battery terminal contacts with the second elongated second ends between the battery terminals, the battery terminal contacts being disposed in a spaced-apart arrangement on the battery.

12. The apparatus of claim 1, spacing between the spaced-apart first elongated ends of the conductive members differing from spacing between the spaced-apart second elongated ends, the first and second electrical plugs being thereby adapted for providing electrical connections to batteries of differing battery terminal contact arrangement.

13. The apparatus of claim 12, the first electrical plug being adapted for engaging terminal contacts of a standard tower-type rechargeable battery for a cordless power tool, the second electrical plug being adapted for engaging terminal contacts of a standard slide-on-type rechargeable battery for a cordless power tool.

14. The apparatus of claim 1, further comprising a housing for substantially insulating the conductive members and an external surface of the conductive sleeve from a use environment while leaving elongated ends of the conductive members and an internal surface of the sleeve exposed for providing electrical connections.

15. The apparatus of claim 14, the housing comprising a polymeric material, the conductive members and the conductive sleeve being embedded within the polymeric material.

16. The apparatus of claim 1, the spaced-apart first ends of the conductive members being resiliently biased so as to resist relative lateral movement in at least one direction.

17. The apparatus of claim 16, the first electrical plug being adapted for engaging terminal contacts of a standard slide-on-type rechargeable battery for a cordless power tool.

18. The apparatus of claim 16, the spaced-apart first elongated ends of the conductive members being resiliently biased so as to resist relative lateral movement toward one another, thereby adapting the first electrical plug for engaging the battery terminal contacts with the first elongated ends between the battery terminals, the battery terminal contacts being disposed in a spaced-apart arrangement on the battery.

19. The apparatus of claim 16, the spaced-apart first elongated ends of the conductive members being resiliently biased so as to resist relative lateral movement away from one another, thereby adapting the first electrical plug for engaging, between the elongated first ends of the conductive members, the pair of battery terminal contacts.

20. The apparatus of claim 19, the first electrical plug being adapted for engaging terminal contacts of a standard tower-type rechargeable battery for a cordless power tool.

21. The apparatus of claim 19, the battery terminal contacts being disposed on opposite sides of the battery.

22. A method for connecting a battery to a device plug, the device plug having an outer surface including a conductive portion thereof and a center conductive pin, the method comprising:

connecting a first battery terminal contact to the conductive portion of the outer surface of the device plug with an electrical adapter; and connecting a second battery terminal contact to the center conductive pin of the device plug with the electrical adapter, the electrical adapter comprising:

an adapter socket including a conductive sleeve and a conductive contact, the sleeve being substantially electrically insulated from the contact, the sleeve forming a passage having an open first end, the sleeve being adapted for (i) receiving the device plug therein and (ii) providing electrical contact to the conductive portion of the outer surface of the device plug, the contact being positioned within the passage at a second end thereof and being adapted for providing electrical contact to the center conductive pin of the device plug;

first and second conductive members electrically connected to the sleeve and contact, respectively, each of the first and second conductive members having a corresponding first substantially rigid elongated end thereof, the corresponding first ends of the first and second conductive members being arranged in a substantially parallel spaced-apart arrangement thereby forming a first electrical plug, the first electrical plug being thereby adapted for engaging the first and second battery terminal contacts and thereby providing electrical connections (i) between the conductive sleeve and the first battery terminal contact and (ii) between the conductive contact and the second battery terminal contact.

23. The method of claim 22, the battery being a standard rechargeable battery for a cordless power tool.

24. The method of claim 22, the electrical adapter further comprising:

a first adapter terminal electrically connected to the first conductive member; and a second adapter terminal electrically connected to the second conductive member, the electrical adapter being thereby adapted for providing electrical connections (i) between the first terminal and the first battery terminal contact and (ii) between the second terminal the second battery terminal contact.

25. The method of claim 22, further comprising limiting an output voltage between the conductive members substantially within an operating voltage range, the electrical adapter further including therefor a voltage limiter connected to the first and second conductive members.

26. The method of claim 22, further comprising limiting an output voltage between the conductive members substantially within an operating voltage range, the electrical adapter further including therefor a voltage regulator, electrical connections between the first conductive member and the sleeve and between the second conductive member and the contact being made through the voltage-regulator.

27. The method of claim 22, further comprising selecting an operating voltage range and limiting an output voltage between the conductive members substantially within the selected operating voltage range, the electrical adapter further including therefor a multiple-output-voltage voltage regulator, electrical connections between the first conductive member and the sleeve and between the second conductive member and the contact being made through the multiple-output-voltage voltage-regulator.

28. The method of claim 22, further comprising indicating to a user polarity of an output voltage between the conductive members, the electrical adapter further including therefor a polarity indicator connected to the first and second conductive members.

29. The method of claim 22, further comprising selecting an output voltage polarity between the conductive members, the electrical adapter further including therefor a polarity switch connected to the first and second conductive members.

30. The method of claim 22, wherein the device plug is connected to an electrical device, the method further comprising supplying the electrical device with power from the battery through the electrical adapter and the device plug.

31. The method of claim 22, the adapter socket being adapted for receiving a device plug in the form of a standard automotive electrical accessory plug.

32. The method of claim 31, the adapter socket being adapted for receiving a device plug in the form of a standard cigarette lighter automotive electrical accessory plug.

33. The method of claim 22, the electrical adapter further comprising a housing for substantially insulating the conductive members and an external surface of the conductive sleeve from a use environment while leaving elongated ends of the conductive members and an internal surface of the sleeve exposed for providing electrical connections.

34. The method of claim 33, the housing comprising a polymeric material, the conductive members and the conductive sleeve being embedded within the polymeric material.

35. The method of claim 22, wherein the device plug is connected to a charging power source, the method further comprising charging the battery through the electrical adapter and the device plug.

36. The method of claim 35, wherein the charging power source comprises a solar panel.

37. The method of claim 22, each of the first and second conductive members having a corresponding second substantially rigid elongated end thereof, the corresponding second ends of the first and second conductive members being arranged in a substantially parallel spaced-apart arrangement thereby forming a second electrical plug, the second electrical plug being thereby adapted for engaging a pair of battery terminal contacts and thereby providing electrical connections (i) between the conductive sleeve and one of the battery terminal contacts and (ii) between the conductive contact and the other of the battery terminal contacts.

38. The method of claim 37,
the spaced-apart first elongated ends of the conductive members being resiliently biased so as to resist relative lateral movement away from one another, thereby adapting the first electrical plug for engaging, between the first elongated ends of the conductive members, a pair of battery terminal contacts,
the spaced-apart second elongated ends of the conductive members being resiliently biased so as to resist relative lateral movement toward one another, thereby adapting the second electrical plug for engaging battery terminal contacts with the second elongated second ends between the battery terminal contacts, the battery terminal contacts being disposed in a spaced-apart arrangement on the battery.

39. The method of claim 37, spacing between the spaced-apart first elongated ends of the conductive members differing from spacing between the spaced-apart second elongated ends, the first and second electrical plugs being thereby adapted for providing electrical connections to batteries of differing battery terminal contact arrangement.

40. The method of claim 39, the first electrical plug being adapted for engaging terminal contacts of a standard tower-type rechargeable battery for a cordless power tool, the second electrical plug being adapted for engaging terminal contacts of a standard slide-on-type rechargeable battery for a cordless power tool.

41. The method of claim 22, the spaced-apart first ends of the conductive members being resiliently biased so as to resist relative lateral movement in at least one direction.

42. The method of claim 41, the battery being a standard slide-on-type rechargeable battery for a cordless power tool.

43. The method of claim 41, the spaced-apart first elongated ends of the conductive members being resiliently biased so as to resist relative lateral movement toward one another, thereby adapting the first electrical plug for engaging the battery terminal contacts with the first elongated ends between the battery terminals, the battery terminal contacts being disposed in a spaced-apart arrangement on the battery.

44. The method of claim 41, the spaced-apart first elongated ends of the conductive members being resiliently biased so as to resist relative lateral movement away from one another, thereby adapting the first electrical plug for engaging, between the elongated first ends of the conductive members, the pair of battery terminal contacts.

45. The method of claim 44, the battery being a standard tower-type rechargeable battery for a cordless power tool.

46. The method of claim 44, the battery terminal contacts being disposed on opposite sides of the battery.

47. A method, comprising:
providing to a user an electrical adapter;
instructing the user to disengage a rechargeable battery from a cordless power tool or a battery charger;
instructing the user to engage a first electrical plug of the electrical adapter and first and second battery terminal contacts of the rechargeable battery; and
instructing the user to plug a device plug into the adapter socket, thereby connecting the device plug and the rechargeable battery,
the device plug having an outer surface including a conductive portion thereof and a center conductive pin, and
the electrical adapter comprising:
an adapter socket including a conductive sleeve and a conductive contact, the sleeve being substantially electrically insulated from the contact, the sleeve forming a passage having an open first end, the sleeve being adapted for (i) receiving the device plug therein and (ii) providing electrical contact to the conductive portion of the outer surface of the device plug, the contact being positioned within the passage at a second end thereof and being adapted for providing electrical contact to the center conductive pin of the device plug;
first and second conductive members electrically connected to the sleeve and contact, respectively, each of the first and second conductive members having a corresponding first substantially rigid elongated end thereof, the corresponding first ends of the first and second conductive members being arranged in a substantially parallel spaced-apart arrangement thereby forming a first electrical plug, the first electrical plug being thereby adapted for engaging the first and second battery terminal contacts and thereby providing electrical connections (i) between the conductive sleeve and the first battery terminal contact and (ii) between the conductive contact and the second battery terminal contact.

48. The method of claim 47, the battery being a standard rechargeable battery for a cordless power tool.

49. The method of claim 47, the electrical adapter further comprising:

a first adapter terminal electrically connected to the first conductive member; and a second adapter terminal electrically connected to the second conductive member, the electrical adapter being thereby adapted for providing electrical connections (i) between the first terminal and the first battery terminal contact and (ii) between the second terminal the second battery terminal contact.

50. The method of claim 47, wherein the electrical adapter further comprises a voltage limiter connected to the first and second conductive members, thereby maintaining an output voltage between the conductive members substantially within an operating voltage range.

51. The method of claim 47, wherein electrical connections between the first conductive member and the sleeve and between the second conductive member and the contact are made through an output voltage regulator, thereby maintaining an output voltage between the conductive members substantially within an operating voltage range.

52. The method of claim 47, wherein electrical connections between the first conductive member and the sleeve and between the second conductive member and the contact are made through a multiple-output-voltage voltage regulator adapted for enabling user selection of an output voltage range, the voltage regulator maintaining an output voltage between the conductive members substantially within a selected operating voltage range.

53. The method of claim 47, wherein the electrical adapter further comprises a polarity indicator connected to the first and second conductive members, thereby indicating to a user polarity of an output voltage between the conductive members.

54. The method of claim 47, wherein the electrical adapter further comprises a polarity switch connected to the first and second conductive members, thereby enabling user selection of polarity of an output voltage between the conductive members.

55. The method of claim 47, wherein the device plug is connected to a charging power source, and the charging power source charges the battery through the electrical adapter and the device plug.

56. The method of claim 47, the adapter socket being adapted for receiving a device plug in the form of a standard automotive electrical accessory plug.

57. The method of claim 56, the adapter socket being adapted for receiving a device plug in the form of a standard cigarette lighter automotive electrical accessory plug.

58. The method of claim 47, wherein the electrical adapter further comprises a housing for substantially insulating the conductive members and an external surface of the conductive sleeve from a use environment while leaving elongated ends of the conductive members and an internal surface of the sleeve exposed for providing electrical connections.

59. The method of claim 58, the housing comprising a polymeric material, the conductive members and the conductive sleeve being embedded within the polymeric material.

60. The method of claim 55, wherein the charging power source comprises a solar panel.

61. The method of claim 47, each of the first and second conductive members having a corresponding second substantially rigid elongated end thereof, the corresponding second ends of the first and second conductive members being arranged in a substantially parallel spaced-apart arrangement thereby forming a second electrical plug, the second electrical plug being thereby adapted for engaging a pair of battery terminal contacts and thereby providing electrical connections (i) between the conductive sleeve and one of the battery terminal contacts and (ii) between the conductive contact and the other of the battery terminal contacts.

62. The method of claim 63, the first electrical plug being adapted for engaging terminal contacts of a standard tower-type rechargeable battery for a cordless power tool, the second electrical plug being adapted for engaging terminal contacts of a standard slide-on-type rechargeable battery for a cordless power tool.

63. The method of claim 61, spacing between the spaced-apart first elongated ends of the conductive members differing from spacing between the spaced-apart second elongated ends, the first and second electrical plugs being thereby adapted for providing electrical connections to batteries of differing battery terminal contact arrangement.

64. The method of claim 47, wherein the device plug is connected to an electrical device, and the battery supplies the electrical device with power through the electrical adapter and the device plug.

65. The method of claim 47, the spaced-apart first ends of the conductive members being resiliently biased so as to resist relative lateral movement in at least one direction.

66. The method of claim 65, the battery being a standard slide-on-type rechargeable battery for a cordless power tool.

67. The method of claim 61, the spaced-apart first elongated ends of the conductive members being resiliently biased so as to resist relative lateral movement away from one another, thereby adapting the first electrical plug for engaging, between the first elongated ends of the conductive members, a pair of battery terminal contacts, the spaced-apart second elongated ends of the conductive members being resiliently biased so as to resist relative lateral movement toward one another, thereby adapting the second electrical plug for engaging battery terminal contacts with the second elongated second ends between the battery terminal contacts, the battery terminal contacts being disposed in a spaced-apart arrangement on the battery.

68. The method of claim 65, the spaced-apart first elongated ends of the conductive members being resiliently biased so as to resist relative lateral movement away from one another, thereby adapting the first electrical plug for engaging, between the elongated first ends of the conductive members, the pair of battery terminal contacts.

69. The method of claim 68, the battery terminal contacts being disposed on opposite sides of the battery.

70. The method of claim 65, the spaced-apart first elongated ends of the conductive members being resiliently biased so as to resist relative lateral movement toward one another, thereby adapting the first electrical plug for engaging the battery terminal contacts with the first elongated ends between the battery terminals, the battery terminal contacts being disposed in a spaced-apart arrangement on the battery.

71. The method of claim 68, the battery being a standard tower-type rechargeable battery for a cordless power tool.

* * * * *